Patented May 22, 1928.

1,670,659

UNITED STATES PATENT OFFICE.

HANS GERDIEN, OF BERLIN-GRUNEWALD, GERMANY, ASSIGNOR TO SIEMENS & HALSKE, AKTIENGESELLSCHAFT, OF SIEMENSSTADT, NEAR BERLIN, A CORPORATION OF GERMANY.

PROCESS OF MAKING ASBESTOS BODIES.

No Drawing. Application filed November 7, 1925, Serial No. 67,688, and in Germany October 17, 1924.

This invention relates to a process of obtaining bodies of great hardness and compressive strength from asbestos. According to the invention, asbestos is heated to a high temperature and then, without permitting much cooling to occur, it is subjected to high pressure by pressure rolls or the like. In this way the asbestos is converted into a hard body which can be sawed, filed or worked in other ways.

Asbestos bodies obtained according to the invention can be used, for example, in place of the usual insulating bodies.

The compression of the asbestos may advantageously be done at a temperature in the neighborhood of from 1000 to 1200° C., and readily attainable pressures at this temperature will produce plates which are easily workable and possess great mechanical strength.

I claim:

1. A process of producing hard bodies from asbestos which comprises heating the asbestos to a high temperature and while it is in this condition, subjecting it to a sufficiently high pressure to increase its density.

2. A process for producing hard bodies from asbestos which comprises heating the asbestos to a temperature in the neighborhood of its melting point, and before it has cooled, subjecting it to a pressure sufficient to consolidate it.

In testimony whereof I affix my signature.

HANS GERDIEN.